United States Patent
Park (10) Patent No.: US 11,709,268 B1
(45) Date of Patent: Jul. 25, 2023

(54) METHOD OF MULTI-PHASE CORRELATIONS VECTOR SYNTHESIS RANGING BY FRACTIONAL CORRELATION

(71) Applicant: Chun Soo Park, Seoul (KR)

(72) Inventor: Chun Soo Park, Seoul (KR)

( * ) Notice: Subject to any disclaimer, the term of this patent is extended or adjusted under 35 U.S.C. 154(b) by 0 days.

(21) Appl. No.: 17/994,756

(22) Filed: Nov. 28, 2022

(51) Int. Cl.
  *G01C 3/08*  (2006.01)
  *G01S 17/36*  (2006.01)
  *G01S 7/4913*  (2020.01)
  *G01S 7/4915*  (2020.01)

(52) U.S. Cl.
  CPC ............ *G01S 17/36* (2013.01); *G01S 7/4913* (2013.01); *G01S 7/4915* (2013.01)

(58) Field of Classification Search
  None
  See application file for complete search history.

(56) References Cited

U.S. PATENT DOCUMENTS

| 11,221,237 B2 | 1/2022 | Park |
| 11,435,455 B2 * | 9/2022 | Park .................. G01S 17/89 |
| 2022/0238577 A1 * | 7/2022 | Basavalingappa ...... G01S 17/89 |

FOREIGN PATENT DOCUMENTS

| DE | 102012204512 A1 * | 9/2013 | ........... G01S 7/4865 |

OTHER PUBLICATIONS

S. Foix et al., "Lock-in time-of-flight (ToF) cameras: a survey," IEEE Sensors J., vol. 11, No. 3, pp. 1-11, Mar. 2011.
C. K. Park et al., "Multiphase Sensor Signal Processing,", IEEE Sens. Lett., vol. 6, No. 6, Jun. 2022.

* cited by examiner

*Primary Examiner* — Mark Hellner
(74) *Attorney, Agent, or Firm* — LRK Patent Law Firm

(57) ABSTRACT

In N-phase correlations vector synthesis time-of-flight (ToF) ranging employing N correlators, the correlation time at each signal cycle is reduced to mitigate pixel saturation by sun light or strong reflected light as well as to minimize the influence of external noise. Typically, the correlation time, during which the received signal is correlated with the transmitting signal, is set to be one full cycle in each transmitting signal period. In this invention, reducing the correlation time to $$\frac{1}{N}, \frac{1}{2N}, \text{ or } \frac{1}{kN}$$

of a full cycle period in each transmitting signal period is disclosed, where k is a real number greater than 1, but k is not 2. Depending on the intensity of the ambient light, the correlation time is flexibly and optimally selected. Multiple fractional correlations produced by a reduced correlation time are integrated over multiple signal periods to obtain more reliable signals of the correlation vectors.

4 Claims, 9 Drawing Sheets

METHOD OF MULTI-PHASE CORRELATIONS VECTOR SYNTHESIS RANGING BY FRACTIONAL CORRELATION

BACKGROUND

1. Technical Field

The claimed subject matter relates to multi-phase correlations time-of-flight (ToF) distance ranging, and particularly to a novel method of fractional correlation between a reflected signal and a transmitting signal for detection of a delayed phase in the reflected signal from an object.

2. Description of Related Art

In ToF ranging, the distance between a transmitter and the object of interest is calculated based on the phase difference (or phase delay) between the transmitting and the reflected and received signals. In general, radio frequency, micro wave, optical, or ultrasonic signals are used in the various ToF applications. ToF cameras measure the phase delay of reflected infrared (IR) light from the transmitted signal. Sergi Foix et al. ("Lock-in time-of-flight (ToF) cameras: A survey," *IEEE Sensors J.*, vol. 11, no. 9, pp. 1917-1926, Spt. 2011.") reviewed ToF cameras that were feasible due to the recent advances in semiconductor technology. The principle of the phase delay measurement of typical lock-in ToF camera is based on simple two-phase I/Q correlations or four-phase correlations with 90° phase delay each other, which is commonly known as the "four-bucket" algorithm.

In multi-phase correlations and vector synthesis ToF ranging, an odd number of N-phase correlations—where N is greater than or equal to 3—are performed between the transmitting signal and the reflected and received signal of an object, which is disclosed in U.S. Pat. No. 11,435,455 B2 by the present inventor. The two-phase orthogonal signals of sine and cosine are vector synthesized from the sequentially phase delayed output signals of the N-phase correlations by a zero-force (ZF) coefficients, which is disclosed in U.S. Pat. No. 11,221,237 B2 by the present inventor.

Figure 1A:
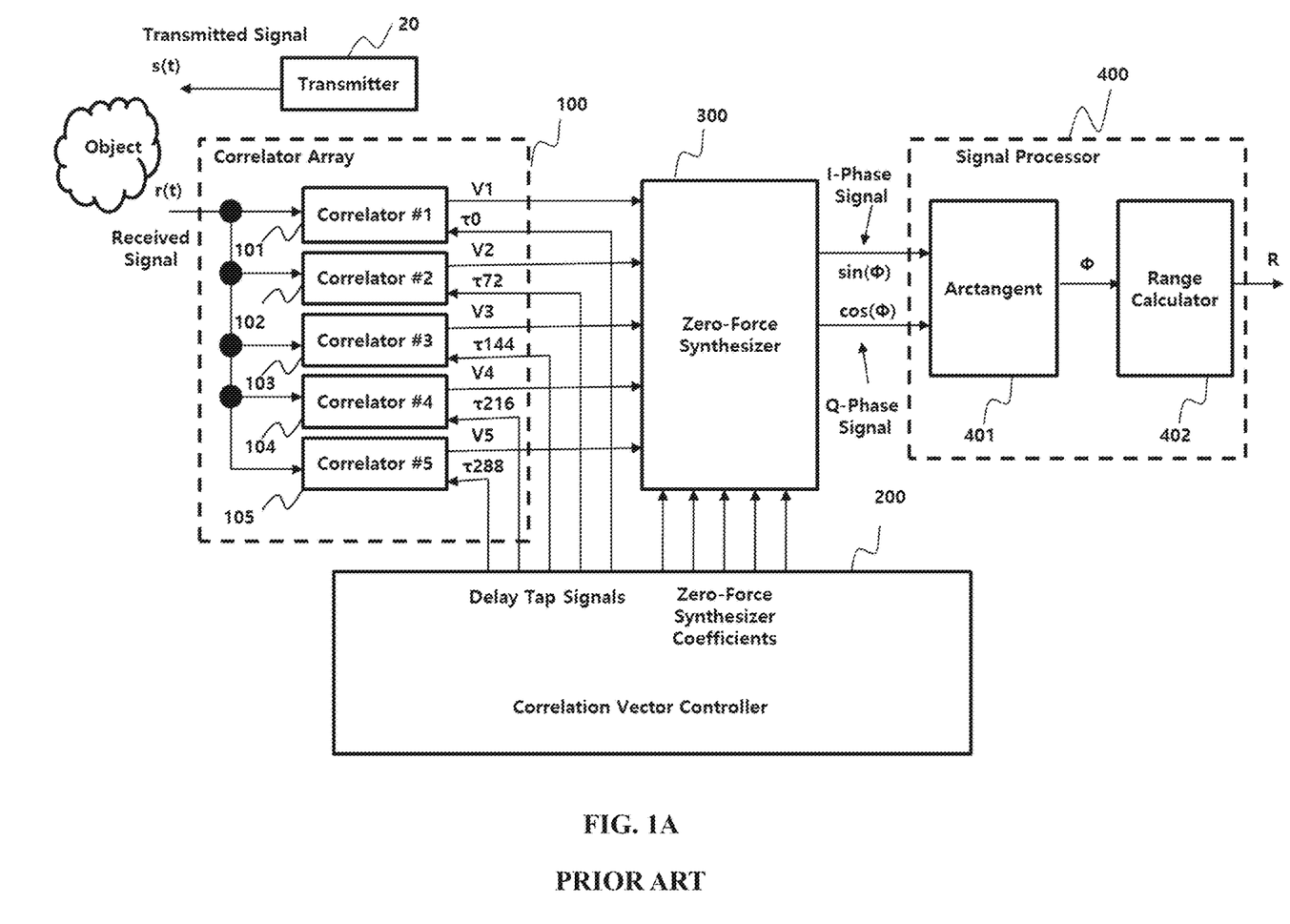
FIG. 1A illustrates a block diagram of a multi-phase correlations time-of-flight (ToF) ranging apparatus for a five-phase case (N=5).
Figure 1B:
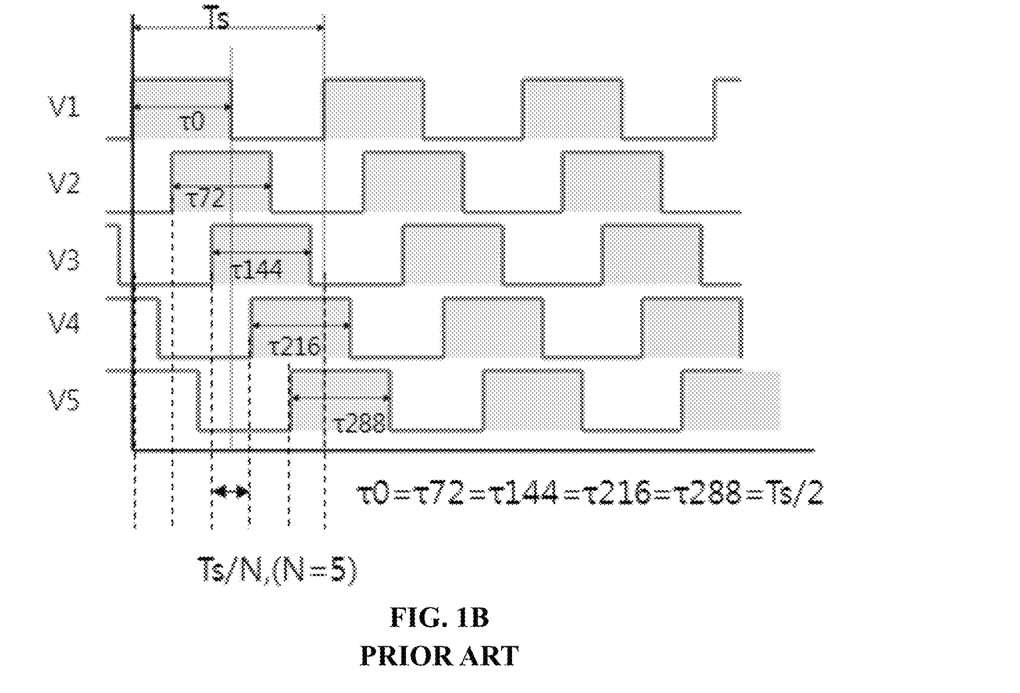
FIG. 1B draws a correlation timing diagram of the multi-phase correlations ToF ranging apparatus in FIG. 1A.

An exemplary block diagram of multi-phase correlations and vector synthesis ToF ranging for the case of N=5 is illustrated in FIG. 1A, where the correlator array (100) comprises five correlators (101~105), the correlation starting time of which is respectively 0°, 72°, 144°, 216°, and 288° delayed in reference to the phase of the transmitting signal. The transmitter (20) transmits the signal s(t), which can be a radio frequency (RF) wave, optical, laser, or ultrasonic signal. The correlator performs correlation with the received signal r(t) synchronized to the transmitting signal s(t). A correlation vector controller (200) generates delay-tap control signals in controlling the correlator array (100). Correlator #1, #2, #3, #4, and #5 begins to correlate with the received signal at sequentially phase delayed positions of $\tau 0$, $\tau 72$, $\tau 144$, $\tau 216$, and $\tau 288$ of the transmitting signal, respectively. In FIG. 1B, a timing diagram of five-correlations is drawn, where five equally 72° delayed correlation starting times and their integration intervals, which are all $T_s/2$, are drawn for the case of 50% duty cycle square-waveform signals.

Let the sampled output correlation vectors of the five-phase correlators be $V_1$, $V_2$, $V_3$, $V_4$, and $V_5$. Then, the ZF synthesizer (300) takes $V_1$~$V_5$ and synthesizes the in-phase and quadrature-phase signals using the pre-determined synthesis coefficients.

Figure 1C:
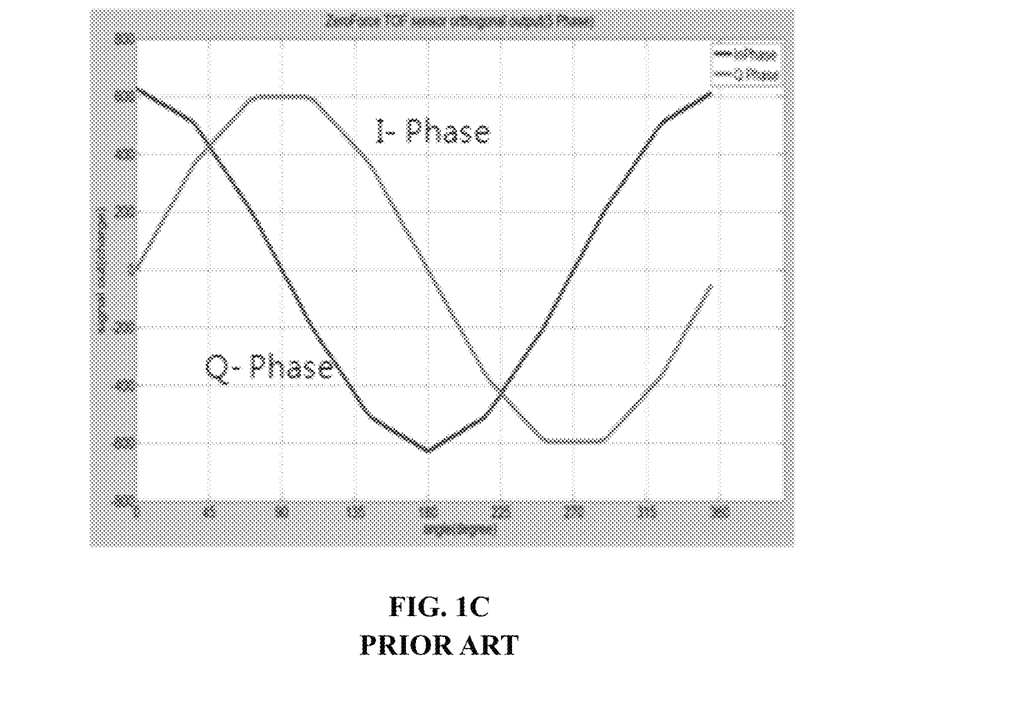
FIG. 1C draws zero-force (ZF) synthesized orthogonal signals by the multi-phase correlations ToF ranging in FIG. 1A via a computer simulation.

The phase delay ($\emptyset$) between the transmitting and the received signal is calculated by taking the arctangent of the ratio of the in-phase to the quadrature-phase signal. The phase delay ($\emptyset$) is further processed to determining the distance (R) between the transmitter and the object. The signal processor block (400) in FIG. 1A comprises an arctangent calculator (401) and a range calculator (402). For the case of N=5, orthogonal signals—in-phase (I) and quadrature-phase (Q) signals—that are synthesized by the ZF synthesizer are shown in FIG. 1C.

Figure 1D:
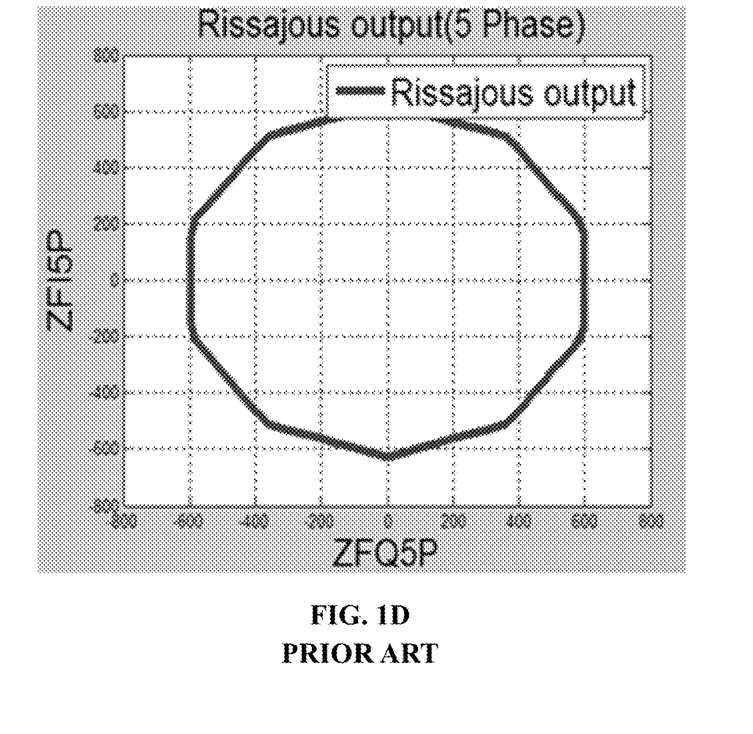
FIG. 1D draws a Lissajous graph of the ZF synthesized orthogonal signals in FIG. 1 C.

The synthesized orthogonal signals are stair step (or stepped) sinusoidal signals having 10(2*N, and N=5) steps in one period, and of which envelopes follow ideal sine and cosine signals. Their Lissajous graph drawn in FIG. 1D has a 10-gon (2*N, and N=5) shape.

Figure 1E:
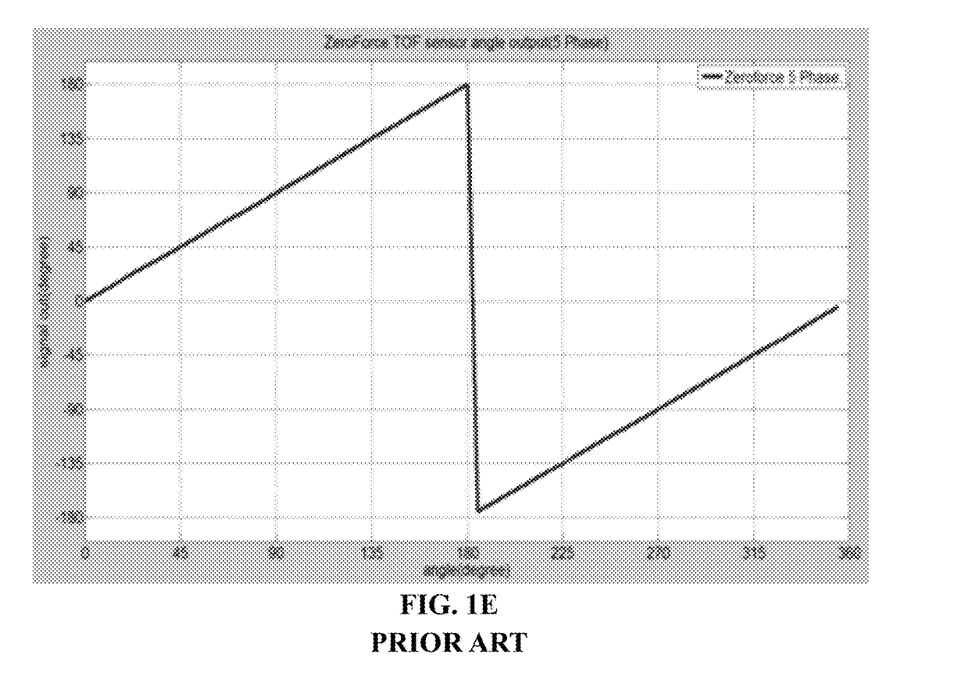
FIG. 1E draws the arctangent of the ratio between the ZF synthesized orthogonal signals in FIG. 1C.

The phase delay ($\emptyset$) obtained by taking the arctangent of the ratio of the stair stepped in-phase to quadrature-phase signal is drawn in FIG. 1E. It is shown that the phase delay ($\emptyset$) is linear over the whole period of 0°~360°. This implies that the detected phase delay varies linearly with the distance variation between the transmitter and the object.

Figure 1F:
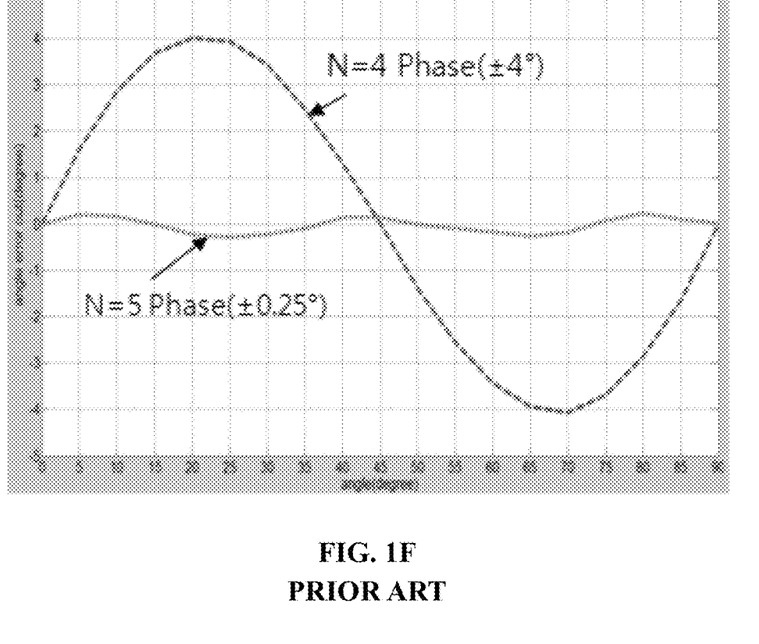
FIG. 1F draws the phase delay measurement error for the ZF synthesized orthogonal signals in FIG. 1C in comparison with that of the conventional four-phase correlations (four bucket) algorithm.

In FIG. IF, the phase delay measurement error is drawn over the 0° and 90° ranges in comparison with that in the conventional four-bucket algorithm. With the conventional four-bucket algorithm, a maximum of ±4° measurement error is observed at 22.5° and 67.5° phase delay. On the other hand, the phase delay measurement errors are within ±0.25° for the 5-phase correlations and orthogonal signal synthesis algorithm. The maximum measurement error is reduced by a factor of around 16 compared with that of the four-phase correlations.

Typically, in the accumulation of photons from the accepted signal at the ToF pixels, the photon accumulation is integrated throughout multiple signal periods, as the received signal from the reflection is very low. For the case of the 50% duty cycle square-waveform signals shown in FIG. 1B, correlation is performed over 180° (½ period) in each transmitting signal cycle, and each correlation is integrated throughout multiple signal periods in order to get reliable correlation vectors.

The integration time during which photons are accumulated should be chosen aptly. When there is excessive reflectance of light over objects or the chosen integration time is too long, pixel saturation could appear and the range measurements will not be valid. This problem can be lessened by an adaptive control of the integration time parameter of the ToF camera.

In order to adjust the integration time at a high level of granularity, it is necessary to set the correlation time to less than one period of the transmitting signal. The present invention has been made in light of the aforementioned background, and discloses a novel method of preventing pixel saturation via a fractional correlation in one signal period. In this fractional correlation, photons are accumulated from the correlation that can be executed within less than half of a period of the transmitting signal.

SUMMARY OF THE INVENTION

The following presents a simplified summary in order to provide a basic understanding of some aspects described herein.

In general aspect, the exemplary embodiments provide methods of reducing the correlation time in N-phase correlations vector synthesis time-of-flight (ToF) ranging.

According to an aspect of the exemplary embodiments, the method of ToF ranging by a fractional correlation in multi-phase correlations and vector synthesis: carrying out a fractional correlation between the received signal and the transmitting signal via configuring a correlation time to of $$\frac{1}{N}$$

a period in one transmitting signal period; obtaining a correlation vector in each of the N-phase correlations by integrating one or multiple fractional correlations over one or multiple transmitting signal periods; synthesizing two-phase orthogonal signals from the correlation vectors of the N-phase correlations using pre-determined zero-force (ZF) synthesis coefficients; determining the phase delay or distance from the two-phase orthogonal signals.

By reducing the correlation time to $$\frac{1}{N}$$

of a period, during which a reflected signal is correlated with the transmitting signal, potential pixel saturation by strong sun light or ambient light is mitigated while the noise influence is minimized. Multiple fractional correlations with the reduced correlation time are integrated over multiple signal cycles to obtain more reliable correlation vectors.

According to an aspect of the exemplary embodiments, the method of fractional correlation includes: configuring the correlation time to $$\frac{1}{2N}$$

of a period in one transmitting signal period.

According to an aspect of the exemplary embodiments the method of fractional correlation includes: configuring the correlation time to $$\frac{1}{kN}$$

of a period in one transmitting signal period, where k is a real number greater than 1, but k is not 2.

Depending on the intensity of the ambient light, the correlation time is flexibly and optimally selected. Each fractional correlation with a reduced correlation time can be extended to many cycles and accumulated to improve the signal quality of the correlation vectors. The correlation vectors are processed by a ZF synthesizer and converted into the in-phase and quadrature-phase signals, from which the phase delay or ranging information is calculated.

In the case of reducing the correlation time by $$\frac{1}{kN}$$

or a period, pre-estimated phase errors having a period of $$\left(\frac{1}{kN}\right)^\circ$$

over 360° are present. Those known phase errors are compensated for by data stored in a look-up table, which are based on the phase difference between a perfect circle and a 2N-gon Lissajous graph, after calculating the phase delay.

One or more of the above-disclosed embodiments, in addition to certain alternatives, are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

DETAILED DESCRIPTION OF THE INVENTION

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

In what follows, the principle of a fractional correlation method in multi-phase correlations time-of-flight (ToF) ranging is explained for the case of N=5—that is, five-phase correlations vector synthesis—that is disclosed in U.S. Pat. No. 11,435,455 B2 by the present inventor. A block diagram of the five-phase correlations vector synthesis ToF ranging is illustrated in FIG. 1A. In U.S. Pat. No. 11,435,455 B2, the starting time of the correlation is shifted by 72° at each of the five correlators, and correlation time is a whole cycle at the five correlators. The effective correlation time, during which a non-zero correlation is performed, is half a period ($T_s/2=180°$) of the transmitting signal, as illustrated in FIG. 1B, where $T_s$ is the period of the transmitting signal. The computer simulation results for the correlation time $T_s/2$ are drawn in FIG. 1C–FIG. 1F. The transmitting signal used in the computer simulation is a 50% duty cycle square-waveform signal.

In the present invention, a flexible correlation time is applied that is less than half a period ($<T_s/2$) of the transmitting signal. Each fractional correlation at each signal cycle is accumulated when the total integration time is extended to multiple signal cycles.

Figure 2A:
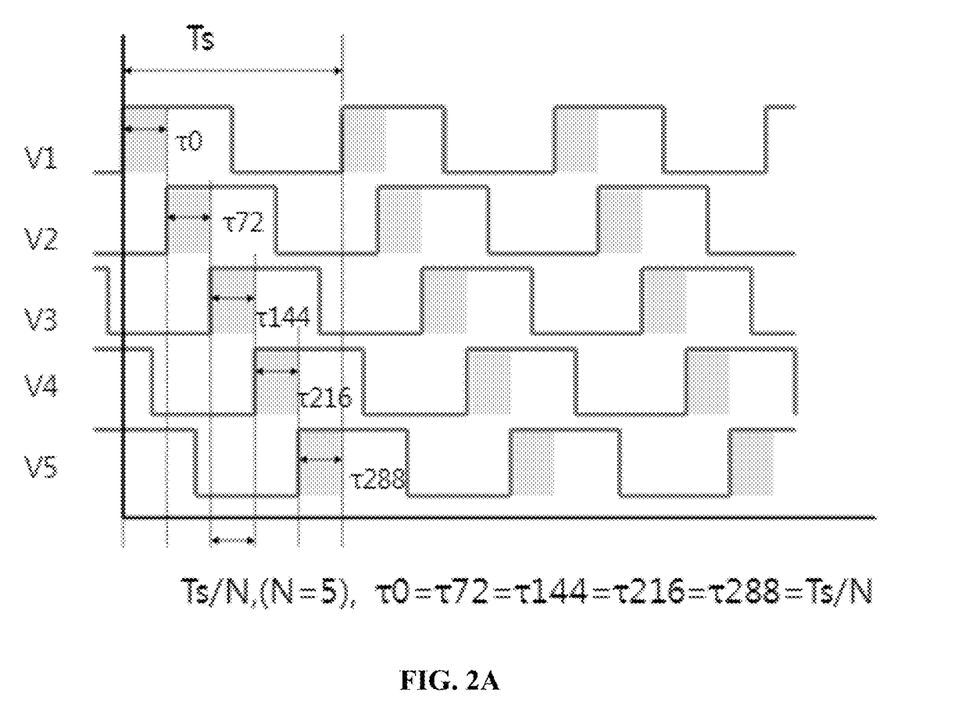
FIG. 2A draws a correlation timing diagram when the correlation time is Ts/N in each clock cycle of the transmitting signal for the five-phase case (N=5) in FIG. 1A according to the present invention.
Figure 2B:
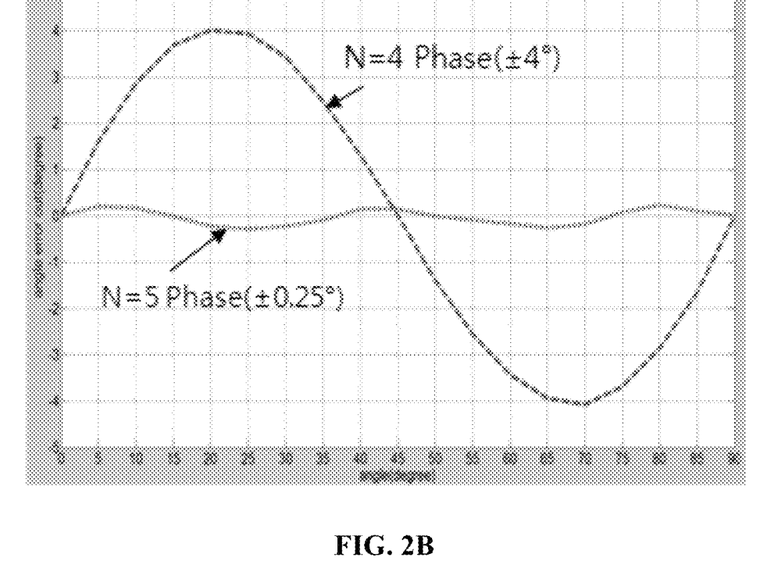
FIG. 2B draws the phase delay measurement error for the ZF synthesized orthogonal signals when the Ts/N correlation time is applied for the case of N=5 in comparison with that of the conventional four-phase correlations (four-bucket) algorithm.

In FIG. 2A, the correlation time of $1/15^{th}$ of a period ($T_s/5=72°$) is applied to correlators #1~#5. The output signals ($V_1$, $V_2$, $V_3$, $V_4$, and $V_5$) of the correlators (#1, #2, #3, #4, and #5), respectively, are the same as those in FIG. 1A. Therefore, the phase delay measurement error (FIG. 2B) of the orthogonal signals ZF synthesized by correlation vectors $V_1$~$V_5$ is the same as that in FIG. 1F.

Even though the correlation time is reduced to $T_s/5$ from $T_s/2$, the maximum measurement error is ±0.25°. This implies that, instead of applying the correlation time of half a period, an equivalent result is obtained by applying $$\frac{1}{N}$$

of a period. The advantage of reducing the correlation time is to keep the pixels from being saturated as well as reduce noise by decreasing the correlation time when sun light or strong reflected light is present.

Figure 3A:
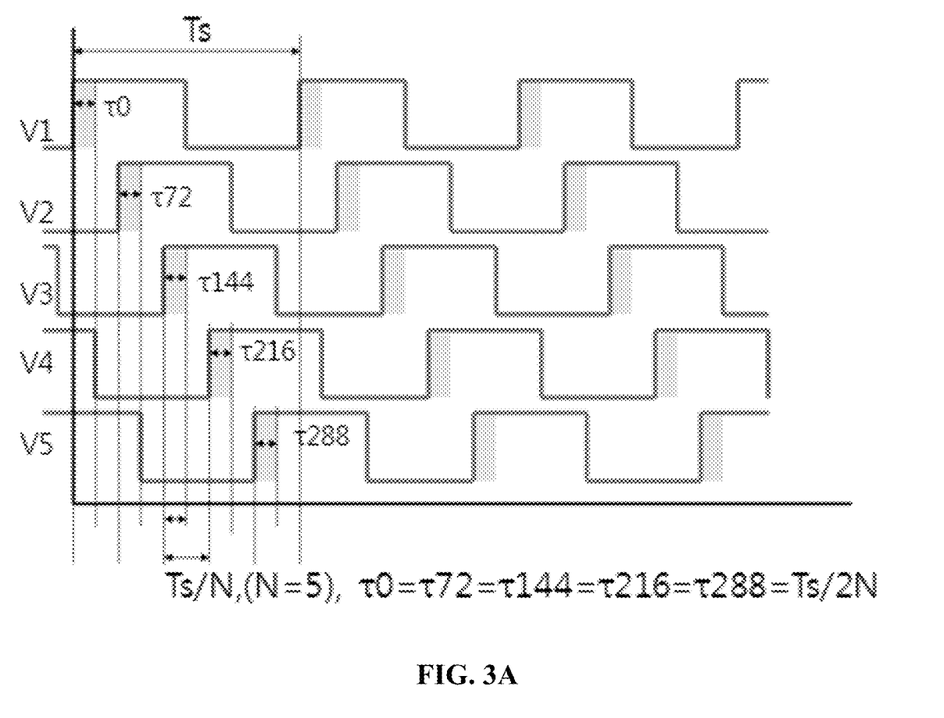
FIG. 3A draws a correlation timing diagram when the correlation time is Ts/(2N) in each clock cycle of the transmitted signal for the five-phase case (N=5) in FIG. 1A according to the present invention.
Figure 3B:
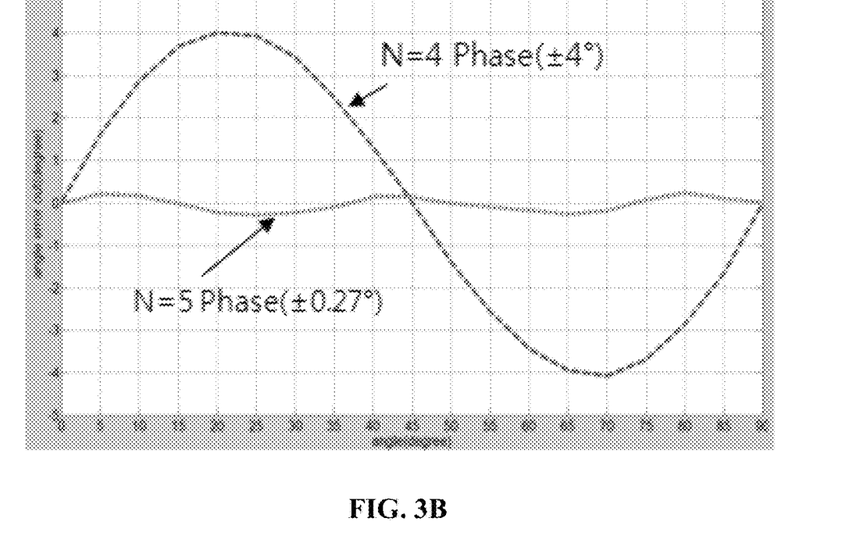
FIG. 3B draws the phase-delay measurement error for the ZF synthesized orthogonal signals when the Ts/(2N) correlation time is applied for the case of N=5 in comparison with that of the conventional four-phase correlations (four-bucket) algorithm.

In another aspect, a correlation time of $1/10^{th}$ of a period $$\left(\frac{T_s}{2N}=36°\right)$$

is applied to correlators #1~#5, as shown in FIG. 3A. The correlation starting time at each of five correlators is shifted by 72° ($T_s/5=72°$) as before; however, the correlation time is further reduced to $$\frac{1}{2N}$$

of a period of the transmitting signal.

The Lissajous graph of the ZF synthesized orthogonal signals for the 50% duty cycle square-waveform input signals is a 2N-gon as disclosed in U.S. 11,221,237 B2 by the present inventor. For the case of N=5, the Lissajous graph for the signals in FIG. 1C is a 10-gon, as drawn in FIG. 1D. Since the angle of each side of the 10-gon is 36°, the correlation time of 36° in FIG. 3A implies physically that the correlation is performed for one side of the total of 10 sides. In this case, the phase delay measurement error of the ZF synthesized orthogonal signals is shown to be ±0.27°, which is very close to the ±0.25° that was achieved with a 180° correlation time of a period in FIG. 1F. By shortening more of the correlation time, pixel saturation can be greatly reduced and the amount of noise infiltrating the pixels can also be lowered.

Figure 4A:
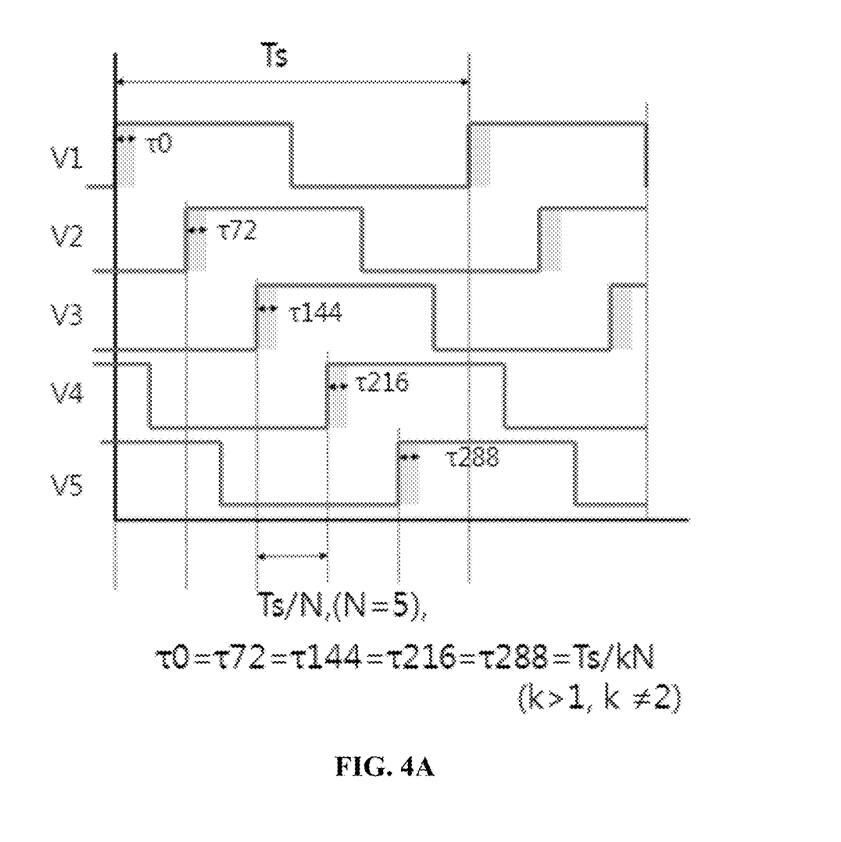
FIG. 4A draws a correlation timing diagram when the correlation time is Ts/(kN) in each clock cycle of the transmitting signal for the five-phase case (N=5) in FIG. 1A according to the present invention.
Figure 4B:
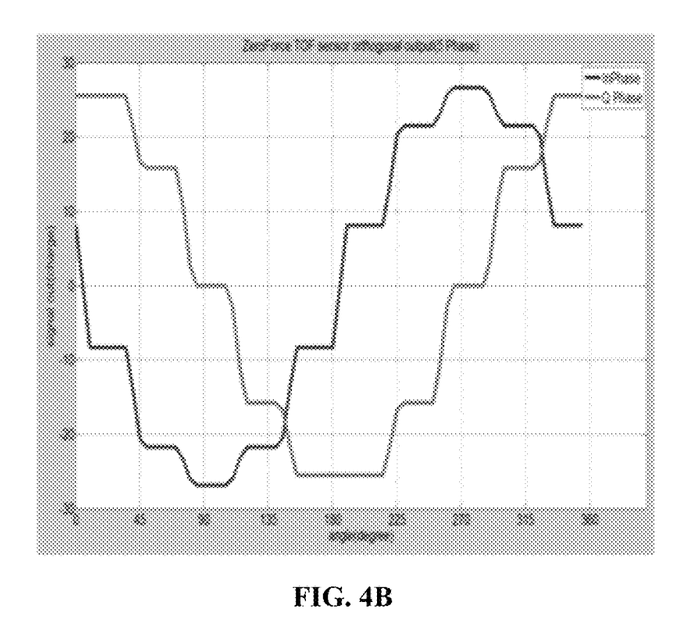
FIG. 4B draws zero-force (ZF) synthesized orthogonal signals when the correlation time Ts/(kN) is applied for the case of N=5 and k=7.2 in FIG. 4A.
Figure 4C:
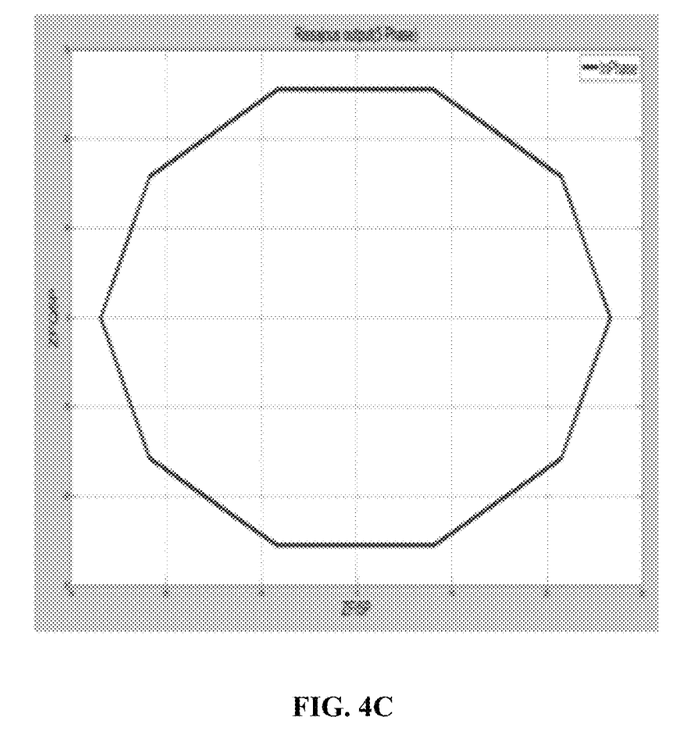
FIG. 4C draws a Lissajous graph of the ZF synthesized orthogonal signals in FIG. 4B.
Figure 4D:
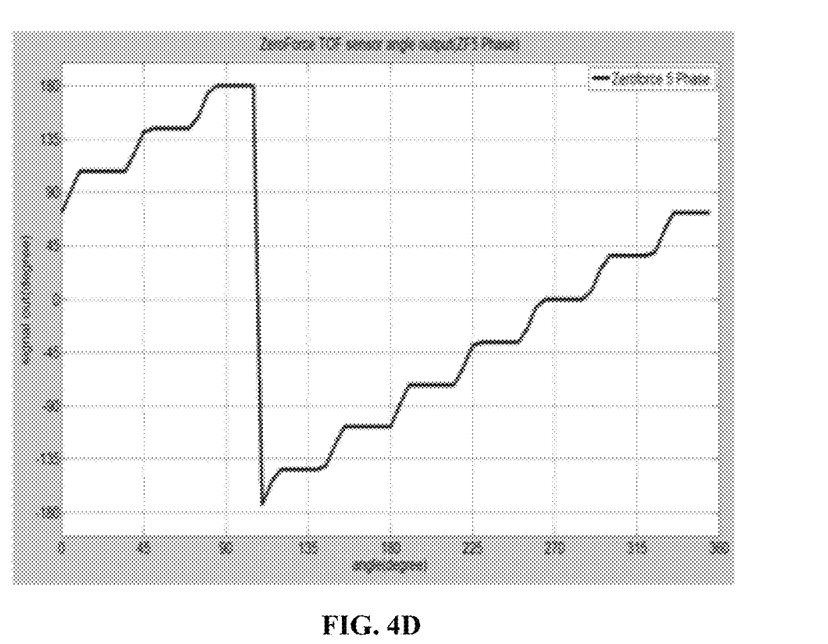
FIG. 4D draws the arctangent of the ratio between the ZF synthesized orthogonal signals in FIG. 4B.
Figure 4E:
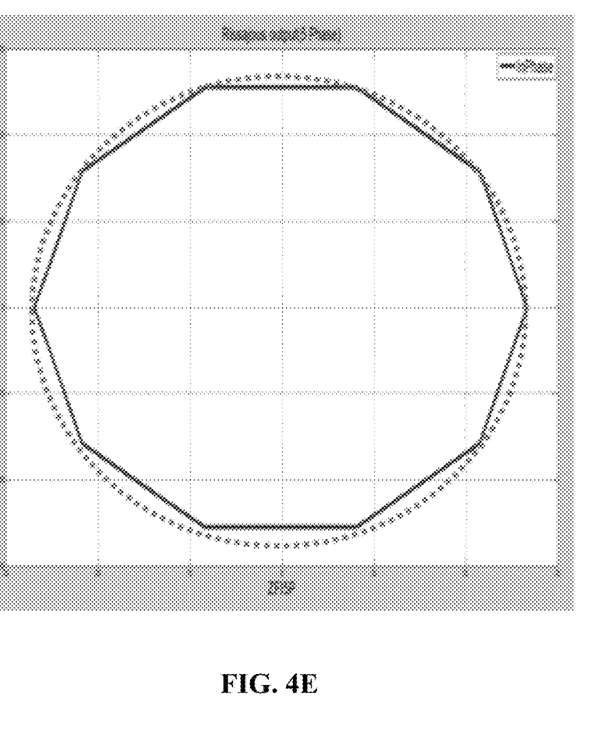
FIG. 4E draws the phase error between the perfect circle and the Lissajous graph in FIG. 4C.

In a further development, the correlation time can be reduced $$\frac{1}{kN}$$

or one period of the transmitting signal, where k is a real number greater than 1, but k is not 2. As long as the correlation starting time of each of the five correlators is equally spaced by 72° ($T_s/5=72°$), the correlation time of $$\frac{1}{kN}$$

of a period of the transmitting signal yields legitimate five correlation vectors. In FIG. 4B, orthogonal signals are drawn that are ZF synthesized from the five-phase correlations vectors when the correlation time k=7.2—correlation time is 10° of a 360° period—is applied. In FIG. 4C and FIG. 4D, a Lissajous graph and the arctangent of the ratio between the ZF synthesized orthogonal signals are drawn, respectively. The Lissajous graph still holds a 10-gon shape; however, the phase estimation shows a periodic phase error in the arctangent graph (FIG. 4D). The periodic phase estimation errors have a certain repetitive pattern every 36° over one period of the transmitting signal. The repetitive error pattern of phase estimation is due to an intrinsic characteristic of the ZF synthesis. On the whole, the estimated phase asymptotically approaches an ideal circle, as drawn in FIG. 4E.

Figure 4F:
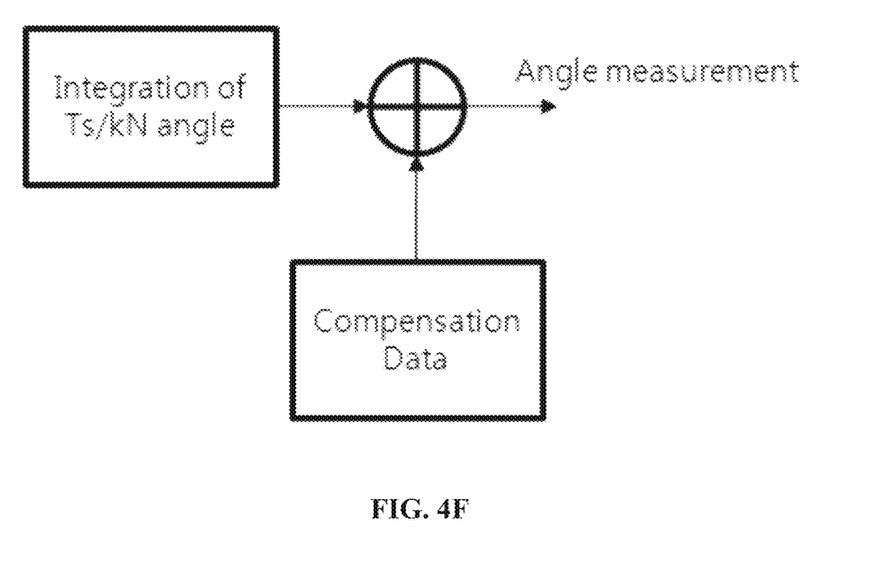
FIG. 4F illustrates a block diagram compensating for the phase delay measurement error in FIG. 4C according to the present invention.

When the number of phases in the N-phase correlations increases such that N=7, 9, and 11, the repetitive phase error pattern becomes a 14-gon, 18-gon, and 22-gon, respectively. Therefore, even though the phase error has the same pattern, the error amount gets smaller as the number of phases increases. As the 2N-gon and an ideal circle is known a priori, the phase error is pre-calculated over the Lissajous circle via piecewise approximation and can be stored in a look-up table to compensate for the error, as illustrated in FIG. 4F. Accordingly, while reducing the correlation time by $$\frac{1}{kN}$$

of a period of the transmitting signal in order to mitigate pixel saturation, accurate phase estimation is feasible by compensating for the pre-calculated error in real time.

The method of reducing the correlation time presented in the invention enables the selection of an optimal correlation time in order to mitigate pixel saturation by sun light as well as to minimize the influence of external noise.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method for measuring a distance between a transmitter and an object based on a phase delay between a transmitting signal and a reflected and received signal by a receiver in N-phase correlations time-of-flight (ToF) ranging, where the receiver includes an N-phase correlation vector controller, a correlator array, a zero-force synthesizer, and a signal processor, the N-phase correlation vector controller generating N delay-tap signals that control N-phase correlators in the correlator array, and each of the N-phase correlators performing an integration by accumulating photons in image sensor pixels of the receiver, where N is an odd number greater than or equal to 3, the method comprising:
   (a) setting, by the N-phase correlation vector controller of the receiver, an integration start time of each of the N-phase correlators, at which time the N-phase correlators start to accumulate photons in the image sensor pixels, where the integration start time of each of the N-phase correlators is sequentially and equally time delayed by one period of the transmitting signal divided by N;
   (b) adjusting, by the N-phase correlation vector controller of the receiver, an integration time of the N-phase correlators, during which time the N-phase correlators accumulate the photons in the image sensor pixels, from one transmitting signal period to $$\frac{1}{N}$$

of the one transmitting signal period;
   (c) obtaining, by the N-phase correlators of the receiver, N correlation vectors over one or more periods of the transmitting signal, where each of the N correlation vectors is sequentially and equally time delayed by one period of the transmitting signal divided by N;
   (d) synthesizing by the zero-force synthesizer of the receiver, two-phase orthogonal signals from the N correlation vectors, where the zero-force synthesizer uses pre-determined synthesis coefficients; and
   (e) determining by the signal processor of the receiver, the phase delay or the distance from the two-phase orthogonal signals.

2. The method according to claim 1, wherein in the step (b), the adjusting is performed from one transmitting signal period to $$\frac{1}{2N}$$

of the one transmitting signal period.

3. The method according to claim 1, wherein in the step (b), the adjusting is performed from one transmitting signal period to $$\frac{1}{kN}$$

of the one transmitting signal period, where k is a real number greater than 1, but k is not 2.

4. The method according to claim 1, wherein in the step (e), the distance is further compensated for by pre-estimated phase errors with a period over 360° based on a phase difference between a perfect circle and a 2N-gon Lissajous graph resulting from the two-phase orthogonal signals that are synthesized from the N correlation vectors.

* * * * *